(12) United States Patent
Imamura

(10) Patent No.: US 9,738,327 B2
(45) Date of Patent: Aug. 22, 2017

(54) CONNECTING MEMBER OF STRUCTURE

(71) Applicant: Kobe Steel, Ltd., Kobe-shi (JP)

(72) Inventor: Yoshihaya Imamura, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 224 days.

(21) Appl. No.: 14/645,482

(22) Filed: Mar. 12, 2015

(65) Prior Publication Data
US 2015/0183470 A1 Jul. 2, 2015

Related U.S. Application Data

(62) Division of application No. 14/154,431, filed on Jan. 14, 2014, now Pat. No. 9,352,788.

(30) Foreign Application Priority Data

Feb. 20, 2013 (JP) .................................. 2013-031049
Nov. 25, 2013 (JP) .................................. 2013-242985

(51) Int. Cl.
*F16B 4/00* (2006.01)
*B62D 27/02* (2006.01)
*F16B 17/00* (2006.01)

(52) U.S. Cl.
CPC ............ *B62D 27/02* (2013.01); *F16B 17/004* (2013.01); *B62D 27/023* (2013.01); *Y10T 403/48* (2015.01)

(58) Field of Classification Search
CPC ............. Y10T 403/48; Y10T 403/4916; Y10T 403/407525; Y10T 403/4077; Y10T 403/66; Y10T 403/69; Y10T 403/70; F16B 17/004; B62D 27/023

USPC .... 403/273, 286, 287, 341, 344, 345; 52/31, 52/7, 167.3, 657; 248/200.1, 206.5, 248/220.21, 220.22, 251
See application file for complete search history.

(56) References Cited

U.S. PATENT DOCUMENTS

| | | | |
|---|---|---|---|
| 1,576,874 A | * | 3/1926 | Stevens ............... B29C 37/0082 138/177 |
| 2,752,179 A | * | 6/1956 | Le Febvre .............. A47L 13/24 29/445 |
| 2,794,689 A | | 6/1957 | Rubrum |

(Continued)

FOREIGN PATENT DOCUMENTS

| | | |
|---|---|---|
| CN | 1616177 A | 5/2005 |
| JP | 2000-264246 | 9/2000 |

(Continued)

*Primary Examiner* — Gregory Binda
*Assistant Examiner* — Nahid Amiri
(74) *Attorney, Agent, or Firm* — Oblon, McClelland, Maier & Neustadt, L.L.P.

(57) ABSTRACT

A bracket includes a cylindrical portion and a plate-shaped portion that are integrally formed. The cylindrical portion is provided at one end side of a blank along one direction and is provided with a slit extending over an entire length of the cylindrical portion in the one direction as a result of forming a portion at the one end side of the blank along the one direction into a cylindrical shape extending in the one direction. The plate-shaped portion is provided at the other end side of the blank along the one direction. The cylindrical portion of the bracket is inserted in the cylindrical body member formed of an aluminum alloy material, and the body member and the cylindrical portion are clinched by electromagnetic tube compression.

12 Claims, 12 Drawing Sheets

(56) References Cited

U.S. PATENT DOCUMENTS

| | | | |
|---|---|---|---|
| 2,883,216 A | 4/1959 | Nock | |
| 2,918,175 A * | 12/1959 | Elliott | A47H 1/102 |
| | | | 211/105.2 |
| 3,358,354 A | 12/1967 | Voss et al. | |
| 4,286,893 A | 9/1981 | Pomares | |
| 4,806,042 A | 2/1989 | Swank et al. | |
| 5,343,015 A | 8/1994 | Ryan | |
| 5,425,286 A * | 6/1995 | Laue | B21K 1/766 |
| | | | 29/428 |
| 5,606,790 A * | 3/1997 | Laue | B21K 1/766 |
| | | | 29/517 |
| 5,617,697 A * | 4/1997 | Erwin | E04C 3/29 |
| | | | 256/19 |
| 5,791,708 A | 8/1998 | Capriotti | |
| 5,862,642 A * | 1/1999 | Erwin | E04H 17/1413 |
| | | | 256/19 |
| 6,389,697 B1 * | 5/2002 | Benoit | B21D 26/14 |
| | | | 219/617 |
| 6,406,077 B2 * | 6/2002 | Johnson | B60R 19/18 |
| | | | 293/102 |
| 6,688,803 B2 * | 2/2004 | Maria Van Giezen | F16B 7/044 |
| | | | 403/245 |
| 6,766,608 B1 | 7/2004 | Jelmyer | |
| 6,865,791 B2 | 3/2005 | Cook et al. | |
| 6,990,840 B2 * | 1/2006 | Park | B21D 26/14 |
| | | | 29/419.2 |
| 7,225,588 B2 * | 6/2007 | Nakamura | F16F 7/00 |
| | | | 52/167.1 |
| 7,703,161 B1 | 4/2010 | Handshaw | |
| D701,097 S | 3/2014 | Petruzzelli et al. | |
| 8,701,359 B2 | 4/2014 | Packer et al. | |
| 8,757,798 B2 | 6/2014 | Cody | |
| 9,352,788 B2 * | 5/2016 | Imamura | F16B 17/004 |
| 2004/0056515 A1 | 3/2004 | Nomura | |
| 2005/0097934 A1 | 5/2005 | Park | |
| 2007/0245643 A1 | 10/2007 | Ichikawa et al. | |
| 2011/0133512 A1 * | 6/2011 | Mildner | B60R 19/36 |
| | | | 296/187.09 |
| 2011/0232221 A1 * | 9/2011 | Tsai | E04H 9/021 |
| | | | 52/656.9 |
| 2013/0330124 A1 * | 12/2013 | Haegele | B62D 27/02 |
| | | | 403/345 |

FOREIGN PATENT DOCUMENTS

| | | |
|---|---|---|
| JP | 2004-106704 | 4/2004 |
| JP | 2009-184424 | 8/2009 |

* cited by examiner

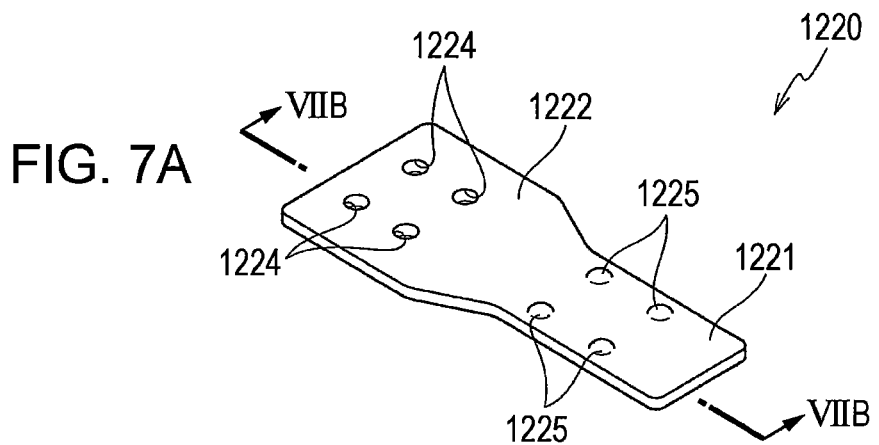
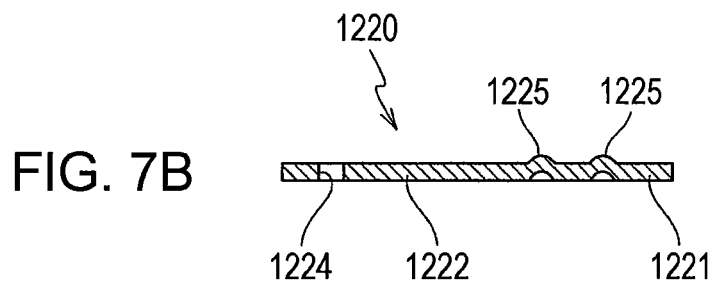
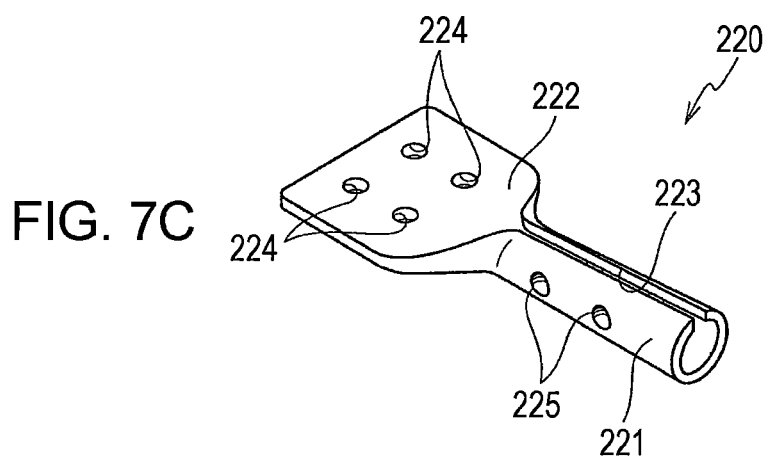

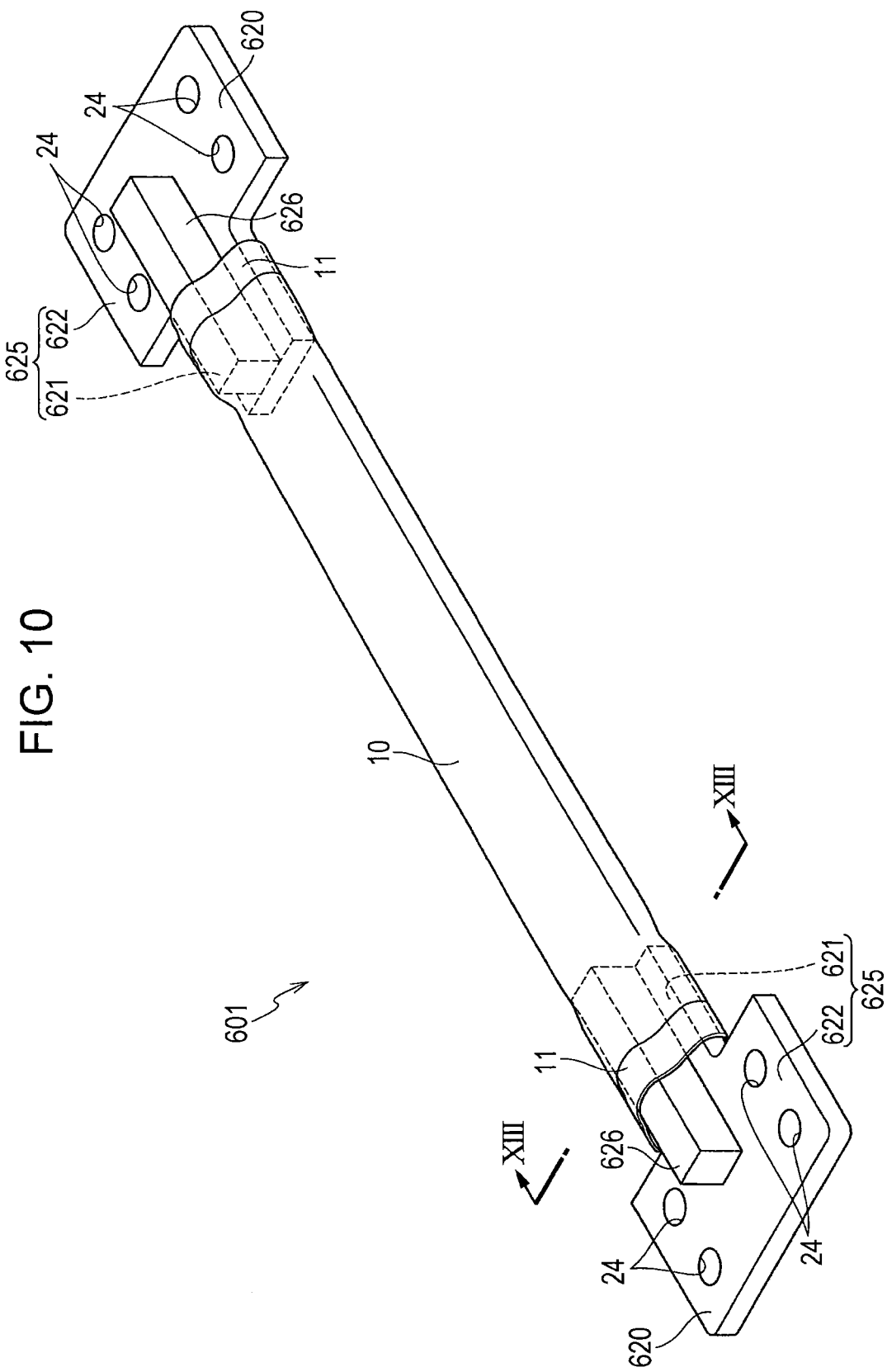

CONNECTING MEMBER OF STRUCTURE

CROSS-REFERENCE TO RELATED APPLICATIONS

The present application is a divisional application of U.S. patent application Ser. No. 14/154,431, filed on Jan. 14, 2014, now U.S. Pat. No. 9,325,788, and claims priority to Japanese patent application nos. 2013-242985, filed Nov. 25, 2013 and Japanese patent application 2013-031049, filed Feb. 20, 2013, the entire contents of which are incorporated herein by reference.

BACKGROUND OF THE INVENTION

1. Field of the Invention

The present invention relates to a connecting member that connects members to each other in a structure including a skeleton construction of, for example, a building or an automobile.

2. Description of the Related Art

A structure including a skeleton construction of, for example, a building or an automobile is formed by assembling a plurality of strength members, such as side frames. Connecting members that connect members to each other for disposing the members apart from each other with a certain gap being provided therebetween in such a structure, or for increasing the strength of such a structure are known (refer to, for example, a reinforcement strut tower 21 in FIG. 2 in Japanese Unexamined Patent Application Publication No. 2004-106704 (Patent Literature 1) and an inclined lower member 18 in FIGS. 2 and 3 in Japanese Unexamined Patent Application Publication No. 2009-184424 (Patent Literature 2)).

In general, such connecting members described above are formed by assembling a plurality of members (formed by pressing a metallic plate) and by fastening the assembled members to each other using welding, or a mechanical fastener such as a bolt. Here, when the members are welded together, the members may become distorted due to welding heat. Therefore, in order to fasten the members together with good precision without thermal distortion, a technology (such as that disclosed in Japanese Unexamined Patent Application Publication No. 2000-264246 (Patent Literature 3)) of clinching the members to each other by electromagnetic forming may be considered. That is, in Patent Literature 3, one of two pipe sections is fitted to an interior of the other of the pipe sections, and a flux concentrating unit of an electromagnetic forming device is placed in the vicinity of a portion where the two pipe sections overlap each other, to generate a magnetic field. This causes an electromagnetic force generated by an induction current to act upon the pipe sections, and the pipe sections to be compressed, as a result of which the members are clinched to each other.

However, when two pipe sections, formed of nonmagnetic materials such as aluminum, are clinched to each other by electromagnetic forming, induction current is similarly generated at the inner member as well as at the outer member. Therefore, the outer member and the inner member are both deformed in a diameter reduction direction. Consequently, sufficient clinching force is not obtained, as a result of sufficient strength may not be provided in the connecting member that connects the strength members of a structure to each other.

In recent years, there is an increasing demand for improving designability, and other members are often disposed between connection members that are to be connected by a connecting member. In such a case, it is necessary to form the connecting member with a shape that does not interfere with the members that are disposed between the connection members. As mentioned above, if the members that form a connecting member are formed by a pressing operation, it may be difficult to form the connecting member with a required shape.

SUMMARY OF THE INVENTION

Accordingly, it is an object of the present invention to provide a connecting member of a structure, which allows the structure to be more freely designed, which is capable of being manufactured with good precision, and which provides high strength.

According to a first aspect of the present invention, there is provided a connecting member of a structure, including a cylindrical body member and a bracket. The cylindrical body member is formed of a nonmagnetic material. The bracket includes a cylindrical portion and a plate-shaped portion that are integrally formed. The cylindrical portion is provided at one end side of a plate material along one direction and is provided with a slit extending over an entire length of the cylindrical portion in the one direction as a result of forming a portion at the one end side of the plate material along the one direction into a cylindrical shape. The plate-shaped portion is provided at the other end side of the plate material along the one direction. At least one of two inner sides at corresponding end portions of the body member has inserted therein the cylindrical portion of the bracket, and the cylindrical portion and the body member are clinched by electromagnetic tube compression.

Since the connecting member of a structure is such that a bracket in which a cylindrical portion and a plate-shaped portion are integrally formed is formed from a plate material, the cylindrical portion and the plate-shaped portion can be formed with various sizes and shapes. Therefore, the structure can be more freely designed. Since the body member and the bracket are clinched by electromagnetic tube compression, it is possible to fasten and secure both the body member and the bracket with the bracket being fixed at a certain position. In addition, since thermal distortion that occurs when the body member and the bracket are fastened by welding does not occur, it is possible to manufacture the connecting member with good precision. Further, a slit extending over the entire length of the cylindrical portion in one direction is formed in the cylindrical portion extending in the one direction. Therefore, when the cylindrical portion is inserted into the body member and the cylindrical portion and the body member are clinched by electromagnetic tube compression, induction current is stopped at the slit in the cylindrical portion. Consequently, whereas the nonmagnetic body member that is disposed at the outer side of the cylindrical portion is compressed, the cylindrical portion of the bracket that is positioned in the body member is hardly compressed. Therefore, it is possible to fasten both the body member and the bracket with sufficient clinching force. This makes it possible to increase the strength of the connecting member.

According to a second aspect of the present invention, there is provided a connecting member of a structure, including a cylindrical body member and a bracket. The cylindrical body member is formed of a nonmagnetic material. The bracket includes a plate material and at least one reinforcing rib that is joined to a surface of the plate material. At least one of two inner sides at corresponding end portions of the body member has inserted therein a portion of the bracket to which the at least one reinforcing rib is joined so that a direction of extension of the at least one reinforcing rib is along a direction of extension of the body member, and the body member and a portion of the bracket inserted in the body member are clinched by electromagnetic tube compression.

Since the connecting member of a structure is such that the bracket is formed by joining a reinforcing rib to a plate material, the bracket can be formed with various sizes and shapes. Therefore, the structure can be more freely designed. Since the body member and the bracket are clinched by electromagnetic tube compression, it is possible to fasten and secure both the body member and the bracket with the bracket being fixed at a certain position. In addition, since thermal distortion that occurs when the body member and the bracket are fastened by welding does not occur, it is possible to manufacture the connecting member with good precision. Further, the reinforcing rib is joined to the portion of the bracket that is inserted into the body member, so that this portion of the bracket has high rigidity. Therefore, when the bracket and the body member are clinched by electromagnetic tube compression, even if induction current is generated at the surface of the bracket, the bracket is hardly deformed, and only the nonmagnetic body member at the outer side of the reinforcing rib is compressed. Consequently, it is possible to fasten both the body member and the bracket with sufficient clinching force. This makes it possible to increase the strength of the connecting member. In addition, the body member that is compressed is not deformed in the same shape as that before compression. Instead, the body member is deformed in a cross-sectional shape having an uneven portion in accordance with the shape of the portion of the bracket to which the reinforcing rib is joined. Therefore, it is possible to increase the strength between the bracket and the body member in the rotation direction (that is, withstand load in the rotation direction). Further, the reinforcing rib makes it is possible to considerably increase bending load of the bracket.

According to a third aspect of the present invention, there is provided a connecting member of a structure, including a cylindrical body member and a bracket. The cylindrical body member is formed of a nonmagnetic material. The bracket includes a plate material and at least one reinforcing rib that is joined to a surface of the plate material. The plate material is bent so that part of a portion of the plate material to which the reinforcing rib is joined has a bend line extending in a direction that crosses a direction of extension of the at least one reinforcing rib. At least one of two inner sides at corresponding end portions of the body member has inserted therein a portion of the bracket to which the at least one reinforcing rib is joined so that the direction of extension of the at least one reinforcing rib is along a direction of extension of the body member, and the body member and a portion of the bracket inserted in the body member are clinched by electromagnetic tube compression.

Since the connecting member of a structure is such that the bracket is formed by joining a reinforcing rib to a plate material, the bracket can be formed with various sizes and shapes. Therefore, the structure can be more freely designed. Since the body member and the bracket are clinched by electromagnetic tube compression, it is possible to fasten and secure both the body member and the bracket with the bracket being fixed at a certain position. In addition, since thermal distortion that occurs when the body member and the bracket are fastened by welding does not occur, it is possible to manufacture the connecting member with good precision. Further, the reinforcing rib is joined to the portion of the bracket that is inserted into the body member, so that this portion of the bracket has high rigidity. Therefore, when the bracket and the body member are clinched by electromagnetic tube compression, even if induction current is generated at the surface of the bracket, the bracket is hardly deformed, and only the nonmagnetic body member at the outer side of the reinforcing rib is compressed. Consequently, it is possible to fasten both the body member and the bracket with sufficient clinching force. This makes it possible to increase the strength of the connecting member. In addition, the body member that is compressed is not deformed in the same shape as that before compression. Instead, the body member is deformed in a cross-sectional shape having an uneven portion in accordance with the shape of the portion of the bracket to which the reinforcing rib is joined. Therefore, it is possible to increase the strength between the bracket and the body member in the rotation direction (that is, withstand load in the rotation direction). The reinforcing rib makes it possible to considerably increase the bending load of the bracket. Further, it is possible to form a bent portion at the bracket. By this, even if there is an interference object between connection members, it is possible to dispose the connecting member away from the interference object. Therefore, the structure can be even more freely designed.

In the connecting member of a structure according to any one of the first to third aspects, the body member may be bent.

In the connecting member of a structure, even if there exists an interference object between connection members, it is possible to dispose the connecting member away from the interference object as a result of bending the body member. Therefore, the structure can be even more freely designed.

In the connecting member of a structure according to any one of the first to third aspects, at least part of the body member may be flattened.

In the connecting member of a structure, even if there exists an interference object between connection members, it is possible to dispose the connecting member away from the interference object as a result of flattening the body member. Therefore, the structure can be even more freely designed.

In the connecting member of a structure according to any one of the first to third aspects, it is possible to bend the body member, and flatten at least part of the body member.

In the connecting member of a structure, even if there exists an interference object between connection members, it is possible to dispose the connecting member away from the interference object as a result of bending and flattening the body member. Therefore, the structure can be even more freely designed.

It is possible to more freely design the structure, manufacture the connecting member with good precision, and increase strength of the connecting member.

BRIEF DESCRIPTION OF THE DRAWINGS

FIG. 7A is a perspective view of a blank according to a second modification of the first embodiment;

FIG. 7B is a sectional view taken along line VIIB-VIIB of the blank shown in FIG. 7A;

FIG. 7C is a perspective view of a bracket formed from the blank shown in FIG. 7A;

FIG. 10 is a perspective view of a connecting member according to a second embodiment of the present invention;

DESCRIPTION OF THE PREFERRED EMBODIMENTS

Preferred embodiments of the present invention are hereunder described with reference to the drawings.

In each embodiment, the case in which a connecting member 1 of a structure according to the present invention is applied to a front-portion structure 90 of the body of an automobile according to the present invention is described. In the description below, a proceeding direction of the automobile corresponds to a "forward direction", a receding direction of the automobile corresponds to a "backward direction", and directions that are horizontal directions and that are orthogonal to the forward direction and the backward direction correspond to a "leftward direction" and a "rightward direction".

Figure 1:
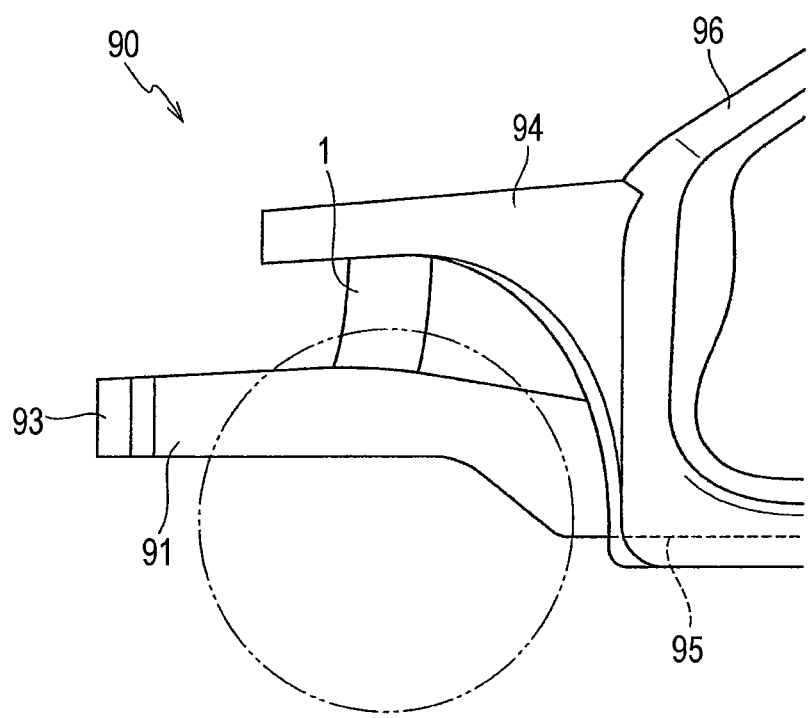
FIG. 1 is a side view of the structure of a front portion of the body of an automobile to which a connecting member of a structure according to the present invention is applied.

As shown in FIG. 1, the front-portion structure 90 constituting an engine compartment that is positioned at the front portion of the body of the automobile includes left and right front side frames 91, a front bumper beam 93, and upper side frames 94. The left and right front side frames 91 are provided at the left and right sides of the front portion of the body, respectively. The front bumper beam 93 bridges front end portions of the left and right front side frames 91 (the front side frame at the far side in FIG. 1 is not shown). The upper side frames 94 are provided at outer sides of the left and right front side frames 91, respectively.

Each front side frame 91 extends in the front-back direction of the body. A back end of each front side frame 91 is connected to a front floor frame 95 extending in the front-back direction of the body at a lower side of an automobile cabin. Each upper side frame 94 extends in the forward direction of the body from a front pillar 96 that constitutes a front end of a door opening portion of the automobile cabin. The connecting member 1 according to the embodiment connects the front side frames 91 and the upper side frames 94 to each other.

First Embodiment

Figure 2:
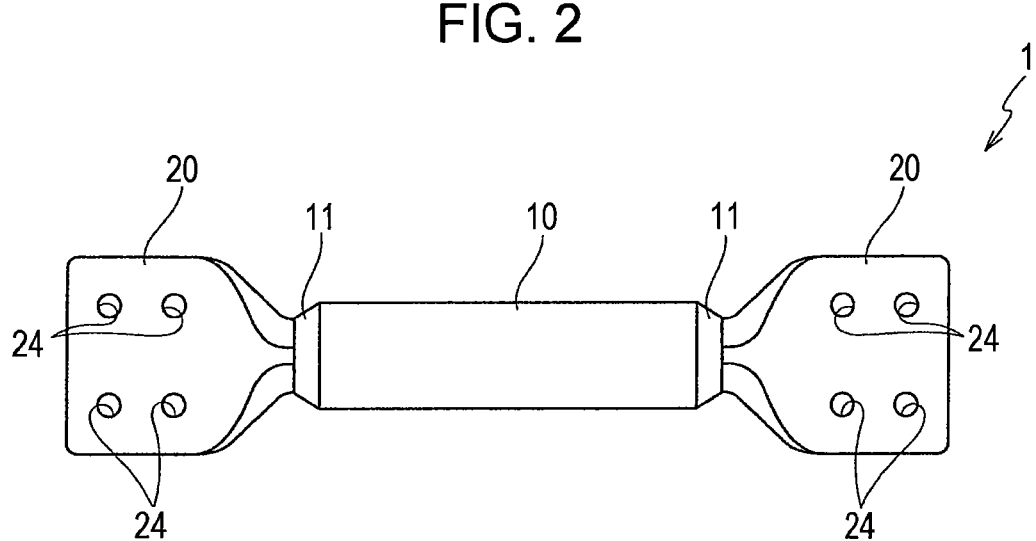
FIG. 2 is a front view of a connecting member according to a first embodiment of the present invention.

Next, the structure of a connecting member 1 according to a first embodiment of the present invention is described with reference to FIG. 2. The connecting member 1 includes a cylindrical body member 10 and brackets 20 that are joined to corresponding ends of the body member 10. Compressed tube portions 11 are provided at two ends of the body member 10. As described in detail below, the brackets 20 are clinched to the body member 10 by electromagnetic tube compression. In the first embodiment, the body member 10 is formed of aluminum alloy, and each bracket 20 is formed of soft steel. That is, the body member 10 is a nonmagnetic member, and each bracket 20 is a magnetic member. Each bracket 20 has bolt holes 24 for receiving bolts for mounting the connecting member 1 to connection members (the front side frames 91 and the upper side frames 94 in the embodiment). In the embodiment, each bracket 20 has four bolt holes 24.

Figure 3:
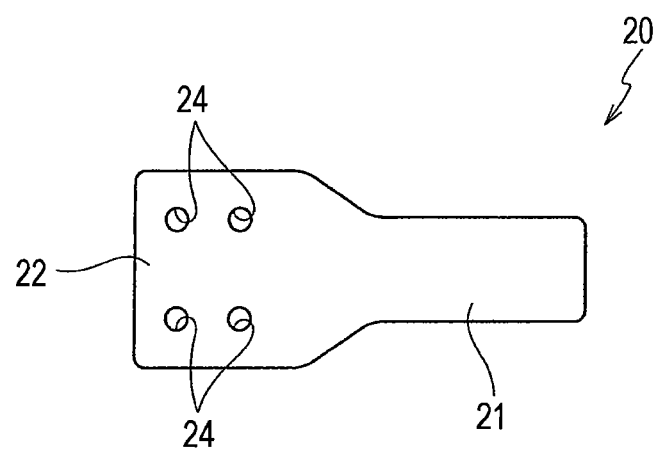
FIG. 3 is a front view of a state of a bracket shown in FIG. 2 before the bracket is joined to a body member.

Here, each bracket 20 is described in detail with reference to FIGS. 3 and 4A and 4B. Each bracket 20 includes a cylindrical portion 21 and a plate-shaped portion 22. Each cylindrical portion 21 is a portion that is inserted into the cylindrical body member 10. One end of each cylindrical portion 21 is formed consecutively with its corresponding plate-shaped portion 22. Each plate-shaped portion 22 is a portion that is mounted to a connection member, and is provided with the aforementioned bolt holes 24.

Each bracket 20 is formed by bending a plate-shaped blank 1020. Each cylindrical portion 21 is integrally formed with its corresponding plate-shaped portion 22. As shown in FIG. 4A, the blank 1020 includes a narrow width portion 1021 (lower right portion), which is positioned at one end side along one direction (from the lower right to upper left in the plane of FIGS. 4A and 4B), and a wide width portion 1022 (upper left portion), which is positioned at the other end side along the one direction and which has a width that corresponds to a length that is greater than the width of the narrow width portion 1021, the length being defined in a direction orthogonal to the one direction. The narrow width portion 1021 is a portion that becomes the cylindrical portion 21 when the bracket 20 is completed. The wide width portion 1022 is a portion that becomes the plate-shaped portion 22 when the bracket 20 is completed, and has holes 1024 that become the bolt holes 24 of the plate-shaped portion 22. In the embodiment, the blank 1020 is a plate material having a uniform thickness.

Figure 4A:
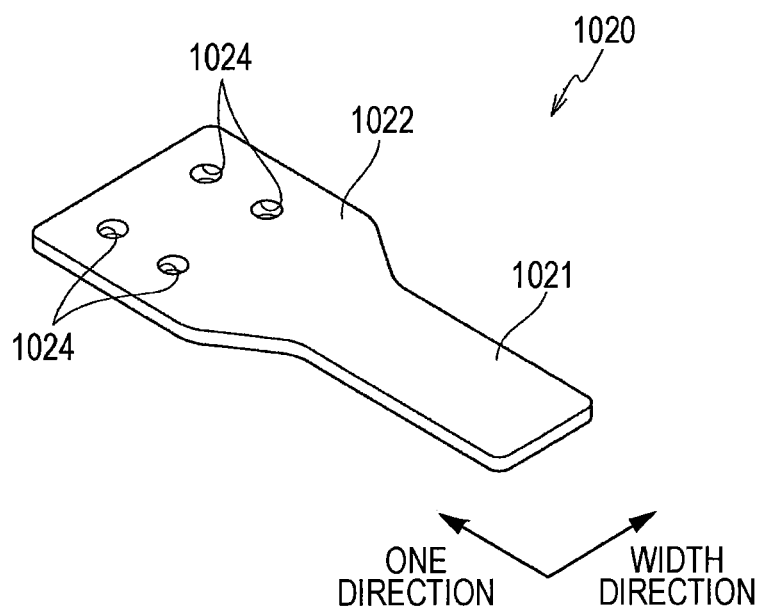
FIG. 4A is a perspective view of a blank before forming the bracket shown in FIG. 3.
Figure 4B:
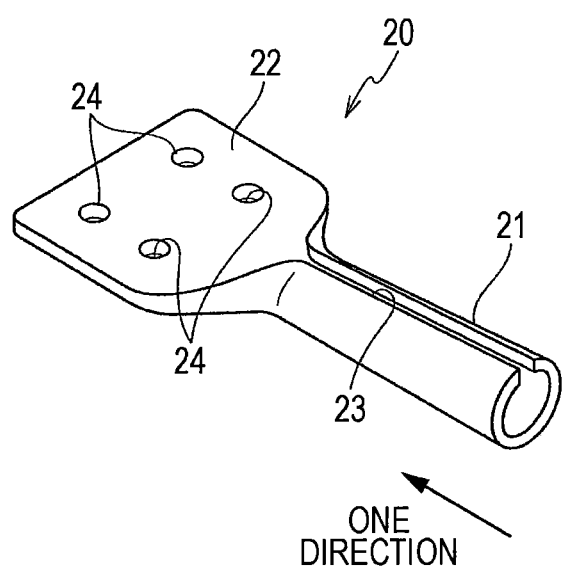
FIG. 4B is a perspective view of a state after forming the bracket from the blank shown in FIG. 4A.

By, for example, pressing a rod-shaped jig extending in the one direction against a width-direction central portion of the blank 1020 shown in FIG. 4A, the narrow width portion 1021 is subjected to bending for forming the narrow width portion 1021 into a cylindrical shape extending in the one direction. As a result, the bracket 20 shown in FIG. 4B is formed. The two ends of the narrow width portion 1021 in the width direction are separated from each other by a slight gap when the narrow width portion 1021 is formed into the cylindrical shape. That is, the slit 23 that extends in the one direction is formed over the entire length of the cylindrical portion of the bracket 20.

Figure 5A:
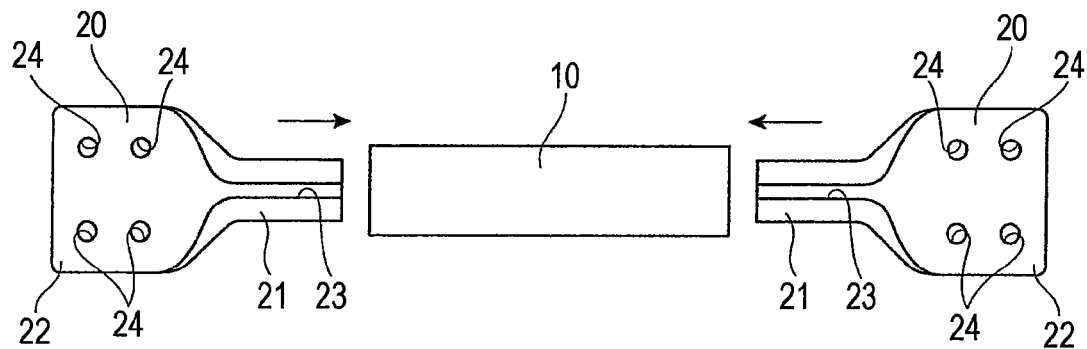
FIG. 5A illustrates steps of manufacturing the connecting member shown in FIG. 2 in the order in which the steps are performed, and a state in which cylindrical portions of brackets are being inserted into corresponding ends of the body member.

Next, the procedure for manufacturing the connecting member 1 by clinching each bracket 20 to the body member 10 by electromagnetic tube compression is described with reference to FIGS. 5A, 5B, and 5C. First, as shown in FIG. 5A, the cylindrical portions 21 of the corresponding brackets 20 are inserted into corresponding ends of the body member 10.

Figure 5B:
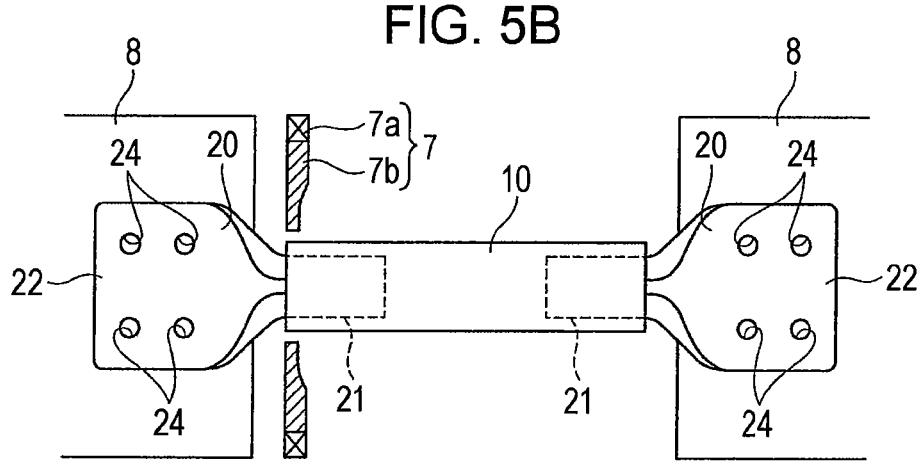
FIG. 5B illustrates steps of manufacturing the connecting member shown in FIG. 2 in the order in which the steps are performed, and a state in which the cylindrical portions and the body member are being fastened to each other.
Figure 5C:
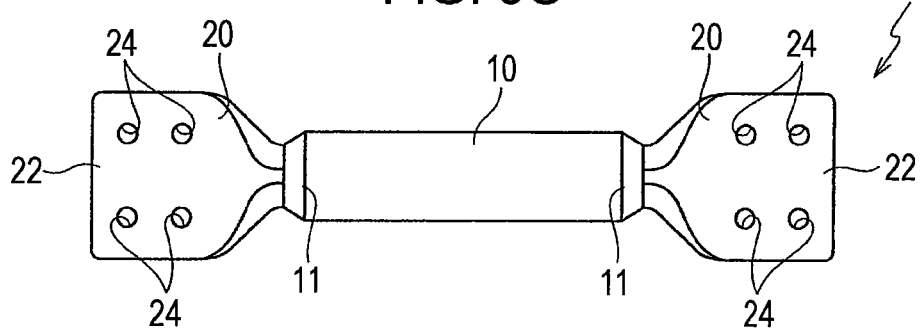
FIG. 5C illustrates steps of manufacturing the connecting member shown in FIG. 2 in the order in which the steps are performed, and a completed connecting member.

As shown in FIG. 5B, an electromagnetic forming unit 7 is disposed at an outer side of a portion where the cylindrical portion 21 and the body member 10 overlap each other. The electromagnetic forming unit 7 includes a coil 7a, which is connected to a power supply (not shown), and a magnetic flux concentrating unit 7b, which is provided at an inner side of the coil 7a and which concentrates magnetic flux that is generated from the coil 7a. That is, the magnetic flux concentrating unit 7b opposes an outer peripheral surface of the portion of the body member 10 that overlaps the cylindrical portion 21.

When an instantaneous high current flows through the coil 7a from the power supply, magnetic flux generated from the coil 7a concentrates at a surface of the magnetic flux concentrating unit 7b that opposes the outer peripheral surface of the portion of the body member 10 that overlaps the cylindrical portion 21. At this time, induction current is generated at the nonmagnetic body member 10. By interaction between the induction current and an electromagnetic field, a force that tries to widen an interval between the magnetic flux concentrating unit 7b and the outer peripheral surface of the portion of the body member 10 that overlaps the cylindrical portion 21, that is, a force that causes the body member 10 to be compressed at the portion where the body member 10 and the cylindrical portion 21 overlap each other (electromagnetic force) acts upon the body member 10.

In contrast, since the bracket 20 is a magnetic member, almost no induction current is generated at the cylindrical portion 21. In addition, at the cylindrical portion 21, the induction current is interrupted by the slit 23. Therefore, almost no force capable of compressing the cylindrical portion 21 acts upon the cylindrical portion 21. That is, whereas the body member 10 that is disposed at the outer side of the cylindrical portion 21 is compressed, the cylindrical portion 21 of the bracket 20 that is positioned in the body member 10 is hardly compressed. Therefore, the portion where the body member 10 and the cylindrical portion 21 overlap each other is clinched by the electromagnetic tube compression of the body member 10. At this time, the cylindrical portion 21 of the bracket 20 acts as an inner mold, and is properly clinched with the body member 10 subjected to tube compression forming from the outer side.

As shown in FIG. 5B, electromagnetic forming is performed in a state in which the plate-shaped portions 22 of the brackets 20 inserted in the corresponding ends of the body member 10 are contacted with corresponding jigs 8 and the brackets 20 are secured at certain positions.

As mentioned above, the connecting member 1 shown in FIG. 5C is completed by clinching the body member 10 and the cylindrical portions 21 of the brackets 20, inserted in the corresponding ends of the body member 10, by electromagnetic tube compression.

As mentioned above, according to the connecting member 1 of the embodiment, in each bracket 20, the cylindrical portion 21 and the plate-shaped portion 22 are integrally formed. As a result of forming a portion at one end side of the plate-shaped blank 1020 along the one direction into a cylindrical shape extending in the one direction, the cylindrical portion 21 is provided at the one end side of the blank 1020 along the one direction, and is provided with the slit 23 extending over its entire length in the one direction. The plate-shaped portion 22 is provided at the other end side of the blank 1020 along the one direction. The cylindrical portion 21 of each bracket 20 is inserted in the cylindrical body member 10, formed of an aluminum alloy material, and the body member 10 and the cylindrical portions 21 are clinched by electromagnetic tube compression.

Therefore, since the brackets 20 in which the cylindrical portions 21 and the plate-shaped portions 22 are integrally formed are formed from the blanks 1020, it is possible to form the cylindrical portions 21 and the plate-shaped portions 22 with various sizes and shapes. Thus, a structure to which the connecting member 1 is applied can be more freely designed. Since the body member 10 and the brackets 20 are clinched by electromagnetic tube compression, it is possible to fasten and secure the body member 10 and the brackets 20 with the brackets 20 being fixed at certain positions. In addition, since thermal distortion that occurs when the body member 10 and the brackets 20 are fastened by welding does not occur, it is possible to manufacture the connecting member 1 with good precision. Further, the slit 23 extending over the entire length of its corresponding cylindrical portion 21 in the one direction is formed in its corresponding cylindrical portion extending in the one direction. Therefore, when each cylindrical portion 21 is inserted into the body member 10 and each cylindrical portion 21 and the body member 10 are clinched by electromagnetic tube compression, induction current is stopped at the slit 23 in its corresponding cylindrical portion 21. Consequently, whereas the nonmagnetic body member 10 that is disposed at the outer side of the cylindrical portions 21 is compressed, the cylindrical portions 21 of the brackets 20 that are positioned in the body member 10 are hardly compressed. Therefore, it is possible to fasten the body member 10 and the brackets 20 with sufficient clinching force. This makes it possible to increase the strength of the connecting member 1.

In the connecting member 1 according to the embodiment, each bracket 20 is a magnetic member formed of soft steel. Therefore, when the cylindrical portions 21 of the brackets 20 and the body member 10 are clinched by electromagnetic tube compression, the cylindrical portions 21 are hardly compressed even if induction current is generated. Thus, it is possible to increase clinching force for fastening the cylindrical portions 21 and the body member 10 to each other.

Further, in the connecting member 1 according to the embodiment, the cylindrical portions 21 of the brackets 22 and the body member 10 are fastened to each other by disposing the cylindrical portions 21 of the brackets 20 in the body member 10 (formed of a nonmagnetic material), causing electric current to flow through the coil 7a disposed at the outer side of the body member 10, and compressing the body member 10. Therefore, the size of the portions where the body member 10 are fastened to the brackets 20 is not large. That is, if the cylindrical portions 21 of the brackets 20 are to be disposed at the outer side of the body member 10 (formed of a nonmagnetic material), it is necessary to expand the body member 10 by electromagnetic forming and to dispose the coil in the body member 10. If the diameter of the coil for an electromagnetic forming operation is small, a sufficient expanding force cannot be obtained. Therefore, the coil cannot be reduced in size. Thus, the portions where the body member 10 and the brackets members 20 are fastened to each other become large.

Modifications of First Embodiment

Next, a first modification and a second modification of the above-described first embodiment are described with reference to FIGS. 6A to 6C and FIGS. 7A to 7C. A connecting member according to the first modification and a connecting member according to the second modification differ from the connecting member according to the first embodiment only in the shapes of brackets 120 and brackets 220 corresponding to the brackets 20 according to the first embodiment. The other structural features are substantially the same as those of the first embodiment. Therefore, they are given reference numerals that are the same as those of their corresponding structural features according to the first embodiment, and are not described below.

Figure 6A:
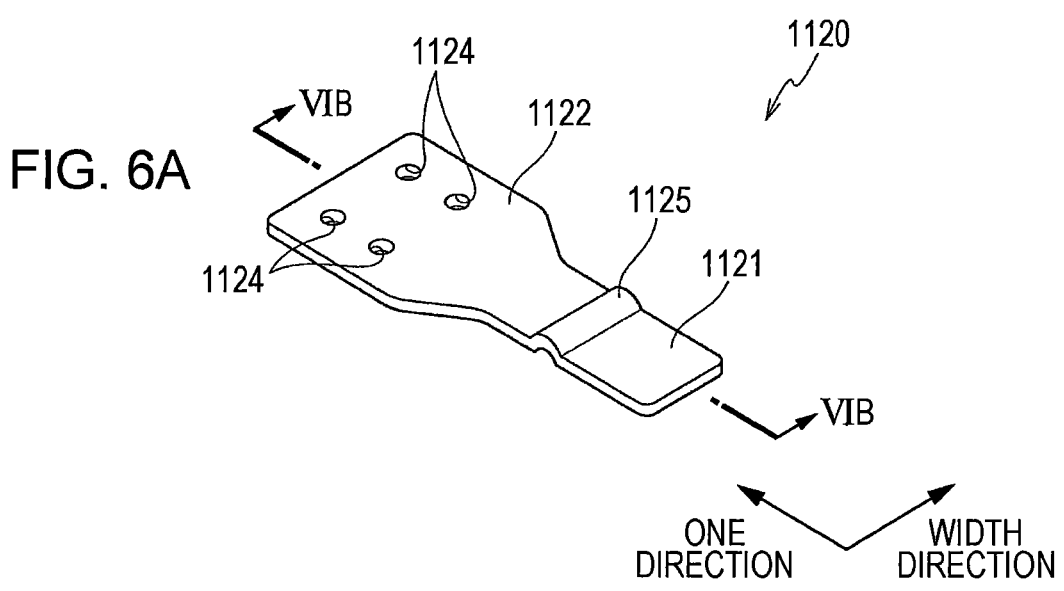
FIG. 6A is a perspective view of a blank according to a first modification of the first embodiment.
Figure 6B:
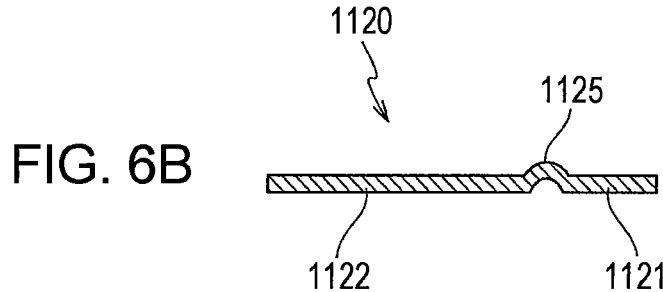
FIG. 6B is a sectional view taken along line VIB-VIB of the blank shown in FIG. 6A.
Figure 6C:
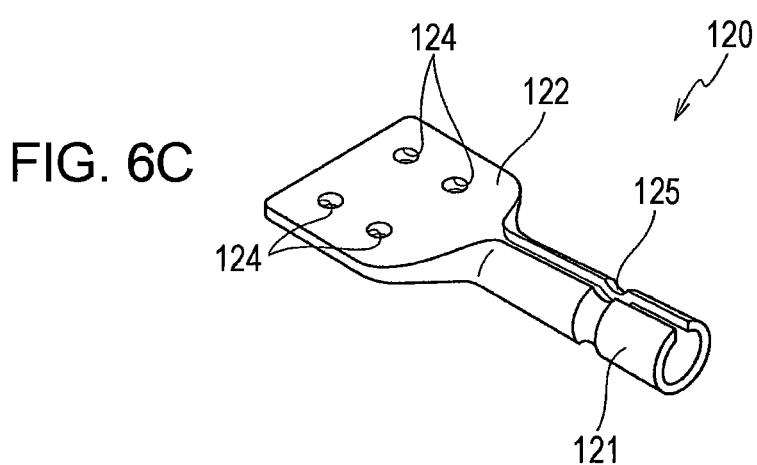
FIG. 6C is a perspective view of a bracket formed from the blank shown in FIG. 6A.

As shown in FIGS. 6A and 6B, a recessed groove 1125 extending in a width direction of a narrow width portion 1121 and formed over the entire width of the narrow width portion 1121 is formed in a blank 1120 from which a bracket 120 according to the first modification is formed. By bending such a blank 1120 and integrally forming a cylindrical portion 121 and a plate-shaped portion 122 to each other, the bracket 120 shown in FIG. 6C is completed. At the time of completion, by the recessed groove 1125 formed in the blank 1120, a bead 125, which is a recessed portion extending inwardly in the cylindrical portion 121 is formed over the entire periphery of the cylindrical portion 121 in a peripheral direction thereof.

As shown in FIGS. 7A and 7B, a plurality of recessed portions 1225 (four recessed portions 1225 in the second modification), which are circular in plan view, are formed in the narrow width portion 1121 of a blank 1220 from which a bracket 220 according to the second modification is formed. By bending such a blank 1220 and integrally forming the cylindrical portion 221 and the plate-shaped portion 222, the bracket 220 shown in FIG. 7C is completed. At this time, the recessed portions 1225 in the blank 1220 become dimples 225, which are recessed portions extending inwardly in the cylindrical portion 221.

In the bracket 120 according to the first modification, the recessed groove 1125, which becomes the bead 125, can be provided by press forming or rolling forming, and can be formed at the same time that holes 1124, which become bolt holes 124, are formed. Similarly, in the bracket 220 according to the second modification, the recessed portions 1225, which become the dimples 225, can be provided by press forming or rolling forming, and can be formed at the same time that holes 1224, which become bolt holes 224, are formed.

According to the first modification, when the cylindrical portion 121 and the body member 10 are clinched by electromagnetic tube compression, the body member 10 that is disposed at the outer side of the cylindrical portion 121 and that is compressed enters the bead 125 of the cylindrical portion 121 disposed in the body member 10. Similarly, according to the second modification, when the cylindrical portion 221 and the body member 10 are clinched by electromagnetic tube compression, the body member 10 that is disposed at the outer side of the cylindrical portion 221 and that is compressed enters the dimples 225 of the cylindrical portion 221 disposed in the body member 10. Therefore, it is possible to prevent the cylindrical portions 121 and 221 and the body member 10 from being shifted from each other after they have been fastened to each other. That is, in the first modification, the bead 125 that is formed over the entire periphery of the cylindrical portion 121 in the peripheral direction makes it possible to prevent the cylindrical portion 121 from being removed from the body member 10. In the second modification, the dimples 225 make it possible to prevent the cylindrical portion 221 from being removed from the body member 10 and from rotating in the body member 10.

Next, a third modification and a fourth modification of the above-described first embodiment are described with reference to FIGS. 8A, 8B, and 8C. A connecting member according to the third modification and a connecting member according to the fourth modification differ from the connecting member according to the first embodiment only in the shape of a body member 310 and a body member 410 corresponding to the body member 10 according to the first embodiment. The other structural features are substantially the same as those of the first embodiment. Therefore, they are given reference numerals that are the same as those of their corresponding structural features according to the first embodiment, and are not described below.

Figure 8A:
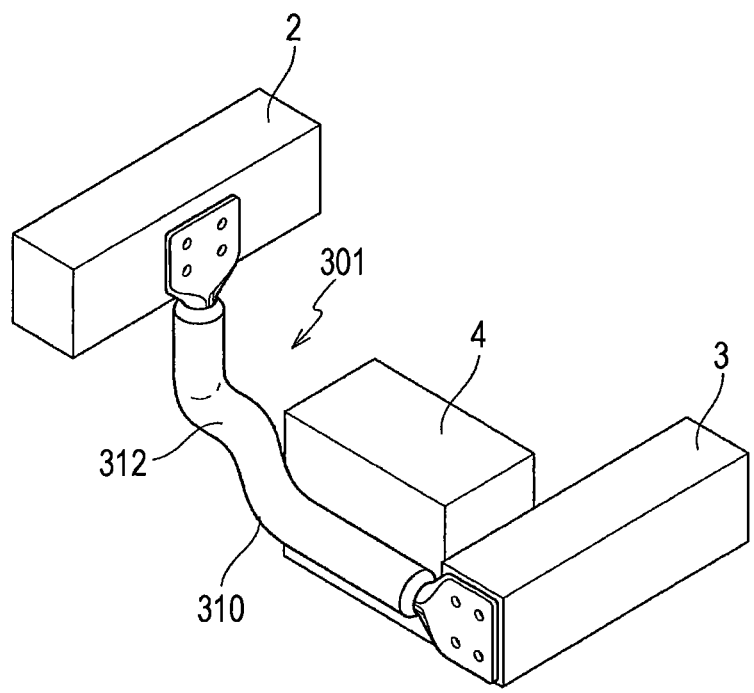
FIG. 8A illustrates a third modification of the first embodiment.
Figure 8B:
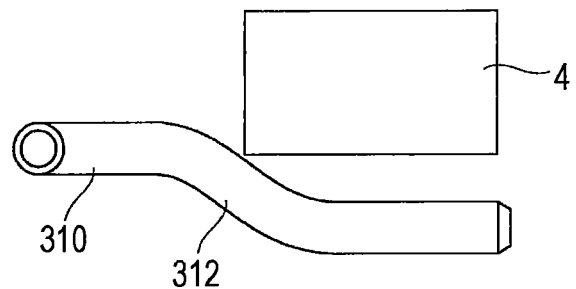
FIG. 8B is a top view of a connecting member shown in FIG. 8A.

As shown in FIGS. 8A and 8B, the body member 310 according to the third modification is bent. That is, the body member 310 is a cylindrical member having a bent portion 312 at a substantially central portion thereof. By bending the body member 310 in this way, as shown in FIG. 8A, even if there exists an interference object 4 between connection members 2 and 3 that are connected to each other by the connecting member 301, the connecting member 301 can be disposed. Although, in the third modification, only one bent portion 312 is provided, a plurality of bent portions 312 may be provided in accordance with the size and shape of the interference object 4.

Figure 8C:
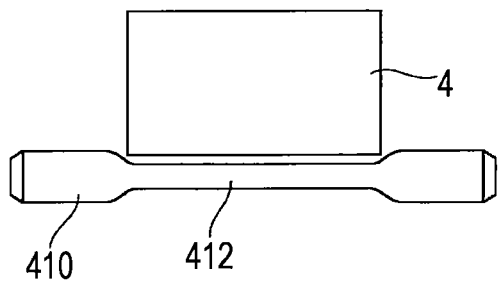
FIG. 8C is a top view of a connecting member according to a fourth modification of the first embodiment.

As shown in FIG. 8C, the body member 410 according to the fourth modification is flattened at a central portion thereof. That is, the body member 410 is a cylindrical member having a flattened portion 412 at the central portion thereof. By flattening the body member 410 in this way, as in the third modification, the body member 410 can be disposed away from the interference object 4 disposed between the connection members 2 and 3. The size and position of the flattened portion 412 can be set as appropriate in accordance with the size and shape of the interference object 4. For example, the entire body member 410 may be flattened.

Further, a fifth modification of the above-described first embodiment is described with reference to FIGS. 9A and 9B. A connecting member according to the fifth modification differs from the connecting member according to the first embodiment only in the shape of a bracket 520 corresponding to the bracket 20 according to the first embodiment. The other structural features are substantially the same as those of the first embodiment. Therefore, they are given reference numerals that are the same as those of their corresponding structural features according to the first embodiment, and are not described below.

Figure 9A:
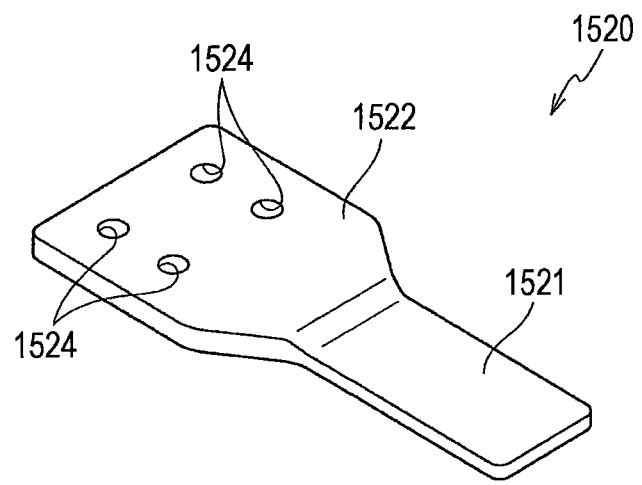
FIG. 9A is a perspective view of a blank according to a fifth modification of the first embodiment.
Figure 9B:
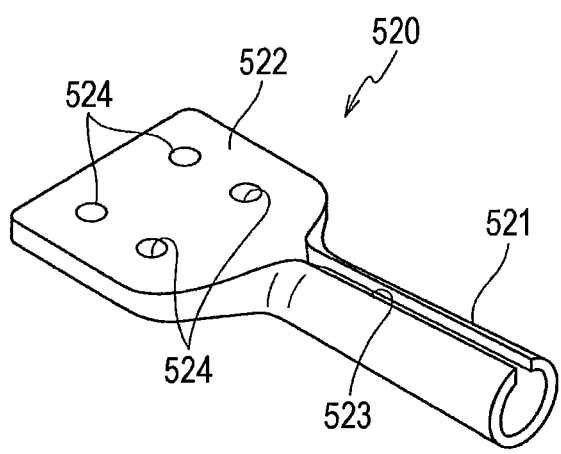
FIG. 9B is a perspective view of a bracket formed from the blank shown in FIG. 9A.

As shown in FIGS. 9A and 9B, a blank 1520 from which the bracket 520 according to the fifth modification is formed is what is called a tailored blank. The plate thickness of a narrow width portion 1521 is less than the plate thickness of a wide width portion 1522. That is, in the bracket 520 that is formed from the above-described blank 1520, the plate thickness of a cylindrical portion 521 is less than the plate thickness of a plate-shaped portion 522. By setting the plate thickness of the cylindrical portion 521 and the plate thickness of the plate-shaped portion 522 to different plate thicknesses, it is possible to change the strength in accordance with various structures. Although, in the fifth modification, the case in which the plate thickness of the cylindrical portion 521 is less than the plate thickness of the plate-shaped portion 522 is described, the plate thickness of the cylindrical portion 521 may be greater than the plate thickness of the plate-shaped portion 522.

Second Embodiment

Next, the structure of a connecting member 601 according to a second embodiment of the present invention is described. The connecting member 601 according to the second embodiment differs from the connecting member 1 according to the above-described first embodiment only in the structure of each bracket 620. The other structural features are substantially the same as those of the first embodiment. Therefore, they are given reference numerals that are the same as those of their corresponding structural features according to the first embodiment, and are not described below.

Figure 11:
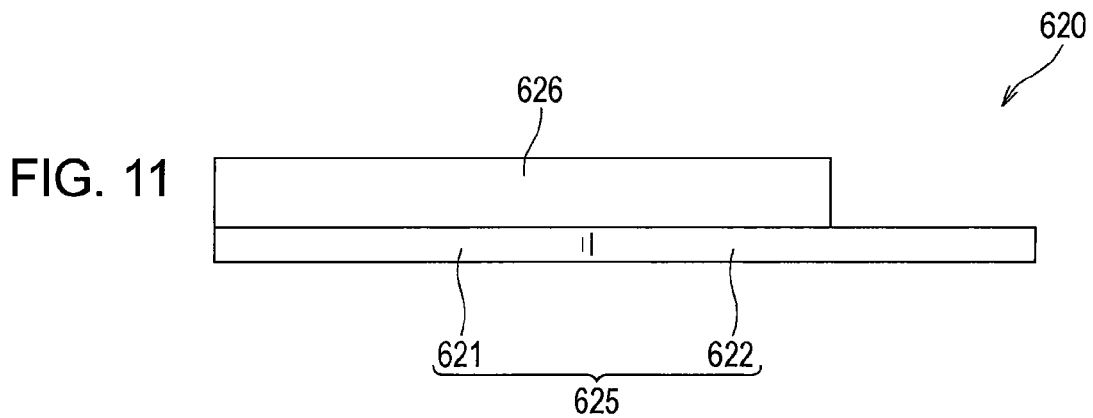
FIG. 11 is a side view of a bracket shown in FIG. 10.

As shown in FIGS. 10 and 11, each bracket 620 according to the second embodiment includes a plate-shaped blank 625 and a reinforcing rib 626, which is joined to one surface of the blank 625. Similarly to the blank 1020 according to the first embodiment, each blank 625 includes a narrow width portion 621, which is positioned at one end side along one direction (that is, the direction from the lower left to the upper right in FIG. 10), and a wide width portion 622, which is positioned at the other end side along the one direction and has a width which corresponds to a length that is greater than the width of the narrow width portion 621, the length being defined in a direction orthogonal to the one direction. Each wide width portion 622 has bolt holes 24.

Each reinforcing rib 626 is disposed so as to extend in the one direction (that is, the direction of arrangement of the narrow width portion 621 and the wide width portion 622 of the blank 625) at a substantially central portion of its corresponding blank 625 in the width direction. Each reinforcing rib 626 is shorter than its corresponding blank 625 in the one direction. One end of each reinforcing rib 626 is aligned with an end of its corresponding blank 625 along the one direction at a side where the narrow width portion 621 is formed, and the other end of each reinforcing rib 626 along the one direction is positioned at the wide width portion 622 of its corresponding blank 625. One end of each reinforcing rib 626 need not be aligned with the end of its corresponding blank 625 along the one direction where the narrow width portion 621 is formed. It only needs to be positioned on the narrow width portion 621 of its corresponding blank 625.

Figure 12:
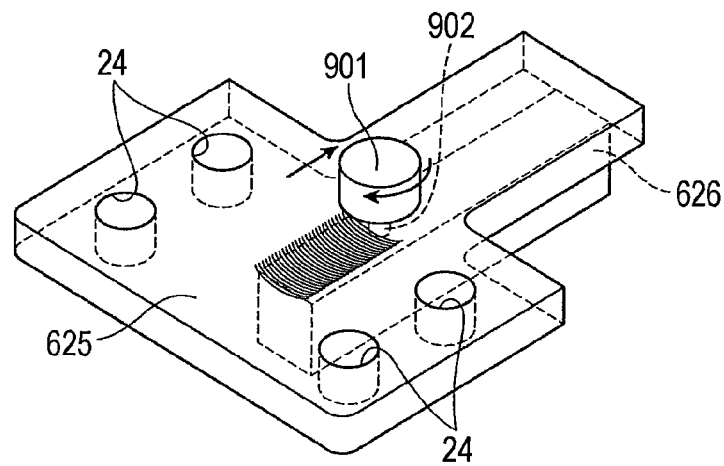
FIG. 12 illustrates joining of a blank and a reinforcing rib shown in FIG. 10.

In the second embodiment, when the blanks 625 and the reinforcing ribs 626 are formed of metallic materials, the blanks 625 and the reinforcing ribs 626 may be joined to each other by friction stir welding. In this case, as shown in FIG. 12, with each reinforcing rib 626 being in contact with one surface (that is, the lower surface in FIG. 12) of its corresponding blank 625, a cylindrical rotary tool 901 while being rotated is pushed against the other surface (that is, the upper surface in FIG. 12) of each blank 625, and a probe 902 at an end of the rotary tool 901 is fitted to each blank 625 and each reinforcing rib 626. At this time, frictional heat that is generated at a location between the probe 902 of the rotary tool 901 and each blank 625, and at a location between the probe 902 of the rotary tool 901 and each reinforcing rib 626 causes plastic flow to occur at a portion where the blank 625 and its corresponding reinforcing rib 626 contact each other. Then, this contact portion is cooled and solidified, so that the blank 625 and its corresponding reinforcing member 626 are joined to each other.

Returning to FIG. 10, the brackets 620 are such that the narrow width portions 621 to which the corresponding reinforcing ribs 626 are joined at the corresponding blanks 625 are inserted in the corresponding ends of the cylindrical body member 10. In the second embodiment, the direction of extension of each reinforcing rib 626 inserted in the body member 10 is parallel to the direction of extension of the body member 10. The direction of extension of each reinforcing rib 626 only needs to be along the direction of extension of the body member 10, and may be slightly shifted from its position where its direction of extension is exactly parallel to the direction of extension of the body member 10. As in the first embodiment, compressed tube portions 11 are provided at two ends of the body member 10, and the body member 10 and the brackets 620 are clinched by electromagnetic tube compression.

Figure 13:
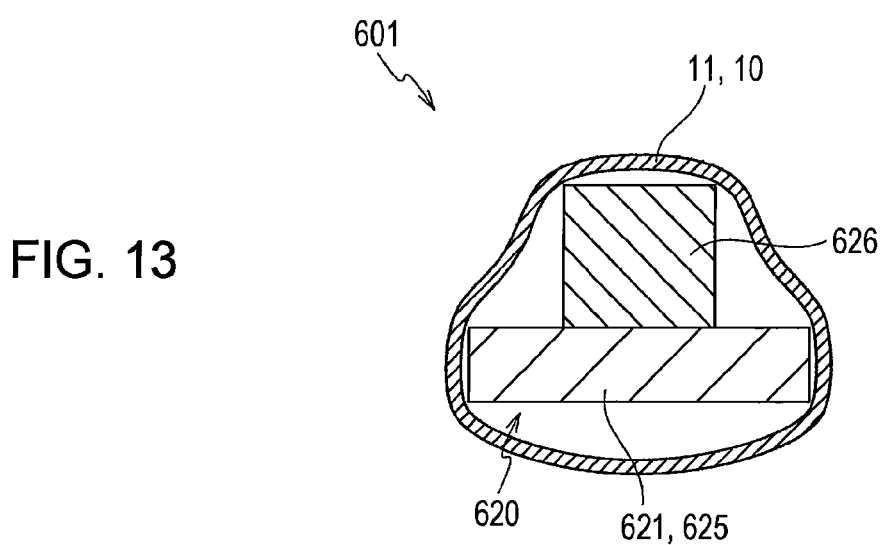
FIG. 13 is a sectional view taken along line XIII-XIII in FIG. 10.

As shown in FIG. 13, which is a sectional view of the connecting member 601 at the compressed tube portion 11, the portion of the bracket 620 that is inserted in the body member 10 has a T shape in cross section that is orthogonal to the insertion direction (in FIG. 13, the shape is an inverted T shape). The compressed body member 10 is deformed into an uneven form along the shape of the bracket 620 that is disposed in the body member 10, and is formed into a partly inwardly projecting shape.

As described above, according to the connecting member 601 of the second embodiment, the brackets 620 are formed by joining the reinforcing ribs 626 to the surfaces of the corresponding plate-shaped blanks 625. In addition, the portions of the brackets 620 to which the reinforcing ribs 626 are joined are inserted into the body member 10 so that the direction of extension of each reinforcing rib 626 is substantially parallel to the direction of extension of the cylindrical body member 10. The body member 10 and the portions of the brackets 620 that are inserted in the body member 10 are clinched by electromagnetic tube compression.

Therefore, since, as in the first embodiment, the body member 10 and the brackets 620 are clinched by electromagnetic tube compression, it is possible to manufacture the connecting member 601 with good precision. In addition, since the brackets 620 are formed by joining the reinforcing ribs 626 to the corresponding plate-shaped blanks 625, the brackets 620 can be formed with various sizes and shapes. Thus, a structure to which the connecting member 601 is applied can be more freely designed. Further, each reinforcing rib 626 is joined to the portion of its corresponding bracket 620 that is inserted into the body member 10, so that this portion of each bracket 620 has high rigidity. Therefore, when the brackets 620 and the body member 10 are clinched by electromagnetic tube compression, even if induction current is generated at the surface of each bracket 620, the brackets 620 are hardly deformed, and only the nonmagnetic body member 10 at the outer side of the brackets 620 is compressed. Consequently, it is possible to fasten the body member 10 and the brackets 620 with sufficient clinching force. This makes it possible to increase the strength of the connecting member 601. In addition, the body member 10 that is compressed is not deformed in the same shape as that before compression. Instead, the body member 10 is deformed in a shape having an uneven portion in accordance with the shape of the portions of the brackets 620 to which the reinforcing ribs 626 are joined. Therefore, it is possible to increase the strength between the brackets and the body member in the rotation direction (that is, withstand load in the rotation direction). Further, each reinforcing rib makes it is possible to considerably increase bending load of its corresponding bracket.

Still further, in the connecting member 601 according to the second embodiment, by joining the blanks 625 and the reinforcing ribs 626 to each other by friction stir welding, the effects of thermal distortion on connection members resulting from melt welding can be reduced. Therefore, it is possible to manufacture the brackets 620 with good precision.

Modification of the Second Embodiment

Next, a modification of the above-described second embodiment is described with reference to FIGS. 14A, 14B, and 15. A connecting member according to the modification differs from the connecting member according to the second embodiment only in the shapes of brackets 720 corresponding to the brackets 620 according to the second embodiment. The other structural features are substantially the same as those of the second embodiment. Therefore, they are given reference numerals that are the same as those of their corresponding structural features according to the second embodiment, and are not described below.

Figure 14A:
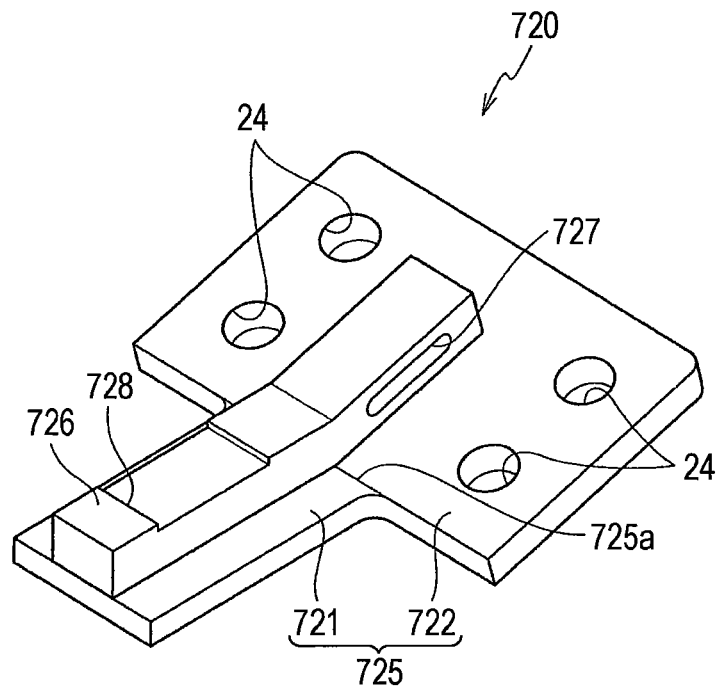
FIG. 14A is a perspective view of a bracket according to a modification of the second embodiment.
Figure 14B:
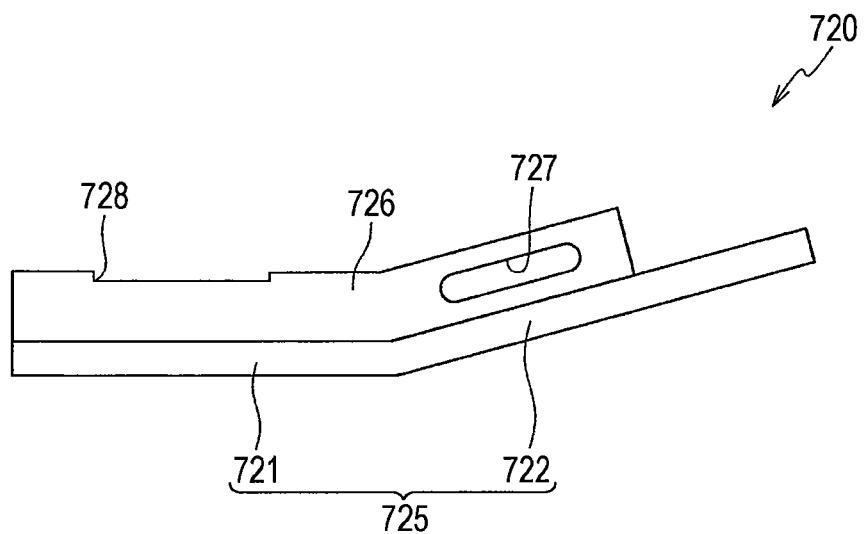
FIG. 14B is a side view of the bracket shown in FIG. 14A.
Figure 15:
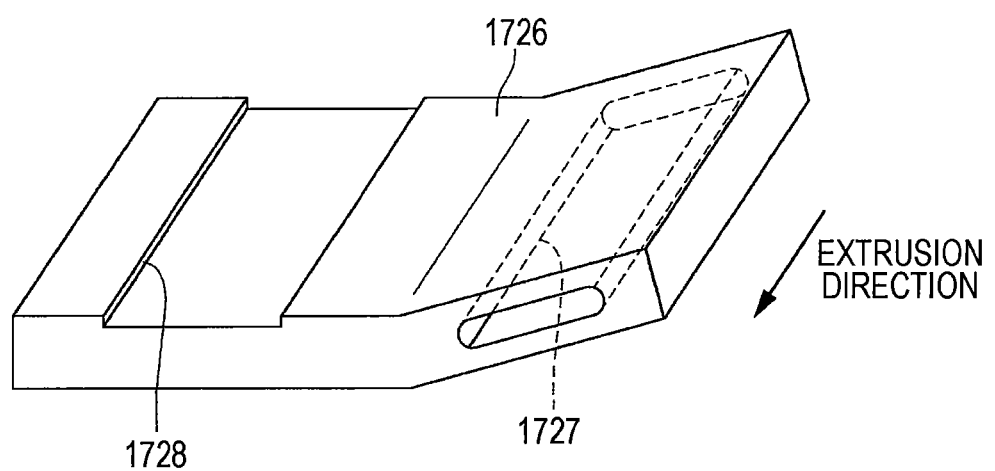
FIG. 15 illustrates a method for manufacturing a reinforcing rib shown in FIG. 14A.

As shown in FIG. 14A, a blank 725 of a bracket 720 according to the modification is bent so that a bend line 725a extending parallel to a surface of the blank 725 and orthogonal to one direction (corresponding to a direction in which a narrow width portion 721 and a wide width portion 722 of the blank 725 are arranged and a direction of extension of a reinforcing rib 726) is formed at a boundary between the narrow width portion 721 and the wide width portion 722. The reinforcing rib 726 that is joined to the blank 725 has a shape that extends along the shape of the bent blank 725. That is, as shown in FIG. 14B, the bracket 720 has a shape having an acute angle in side view from a direction orthogonal to the one direction.

Further, the reinforcing rib 726 has a hollow formed by extrusion process as mentioned below. More specifically, a hollow portion 727 is formed in a portion of a side surface of the reinforcing rib 726 (in the direction of extension thereof) that is joined to the narrow width portion 721 of the blank 725 and in a portion of a side surface of the reinforcing rib 725 (in the direction of extension thereof) that is joined to the wide width portion 721 of the blank 725. A recessed portion 728 extending in a direction orthogonal to the direction of extension of the reinforcing rib 726 is formed in a surface of a portion of the reinforcing rib 726 that is joined to the narrow width portion 721. By this, when each bracket 720 and a body member 10 are clinched by electromagnetic tube compression, the body member 10 that is disposed at the outer side of each bracket 720 and that is compressed enters the recessed portion 728 of the reinforcing rib 726 of each bracket 720 disposed in the body member 10. Therefore, it is possible to prevent the brackets 720 and the body member 10 from being shifted from each other after they have been fastened to each other.

Here, a method for manufacturing a reinforcing rib 726 is described. When manufacturing the reinforcing rib 726, first, as shown in FIG. 15, a plate-shaped molding 1726 having a bend line extending in an extrusion direction is formed by extrusion process. Here, at the same time, the molding 1726 is formed so that two hollow portions 1727 are formed in an extrusion cross section. In addition, at the same time, the molding 1726 is formed so that a recessed portion 1728 extending in the extrusion direction is formed in a surface of the molding 1726. By cutting the molding 1726 in a direction orthogonal to the direction of extrusion, a plurality of reinforcing ribs 726 are continuously manufactured.

In the modification, it is possible to form a bent portion at each bracket 720. By this, even if there is an interference object between connection members, it is possible to dispose the connecting member away from the interference object. Therefore, a structure can be even more freely designed. By cutting to a predetermined width the reinforcing rib 726 after extrusion by extrusion process, it is possible to continuously form a plurality of reinforcing ribs 726 and to easily form brackets having uneven portions in the extrusion direction. Further, by forming a hollow in each reinforcing rib 726, it is possible to reduce the weight of the connecting member.

Although preferred embodiments of the present invention are described, the present invention is not limited to the above-described embodiments and modifications. Therefore, various changes in design may be made within the scope of the claims.

Although the body member 10 according to each of the first and second embodiments and the cylindrical portions 21 of the brackets 20 according to the first embodiment are cylindrical, their shapes are not limited thereto. They may have, for example, the shape of a cylinder whose cross section is an ellipse or a square.

Although, in the first embodiment, the brackets 20 are mounted to corresponding end portions of the body member 10, and, in the second embodiment, the brackets 620 are mounted to corresponding end portions of the body member 10, at least one of the two ends of the base member 10 has a bracket 20 or a bracket 60 mounted thereto.

The materials of the brackets 20 and 620 are not limited to soft steel. The materials thereof may be high-tensile steel that is difficult to weld. The brackets 20 and 620 may be formed of nonmagnetic materials. Therefore, the brackets 20 and 620 may be formed of, for example, high-strength aluminum having low conductivity (2000 series, 7000 series) or a highly insulative resin.

Although, in the second embodiment, the blanks 625 and the reinforcing ribs 626 of the brackets 620 are joined to each other by friction stir welding, the method for joining the blanks 625 and the reinforcing ribs 626 is not limited thereto. That is, the blanks 625 and the reinforcing ribs 626 may be joined by, for example, melt welding (such as laser welding, electron beam welding, or metal inert gas (MIG) welding); using bolts; or a combination of these. When the blanks 625 and the reinforcing ribs 626 are formed of resin, such as carbon-fiber-reinforced plastic (CFRP), the blanks 625 and the reinforcing ribs 626 may be joined with an adhesive.

Although, in the second embodiment, one reinforcing rib 626 is joined to one of the surfaces of its corresponding blank 625, for example, two or more reinforcing ribs may be joined to one of the surfaces of its corresponding blank 625. Alternatively, two reinforcing ribs may be joined, one to each surface of the blank 625.

What is claimed is:

1. A connecting member of a structure, comprising:
   an annular body member formed of a nonmagnetic material; and
   a bracket including a plate material and at least one reinforcing rib that is joined to a surface of the plate material,
   wherein at least one of two inner sides at corresponding end portions of the annular body member has inserted therein a portion of the bracket to which the at least one reinforcing rib is joined so that a direction of extension of the at least one reinforcing rib is along a direction of extension of the annular body member, and wherein the annular body member and a portion of the bracket inserted in the annular body member are clinched by electromagnetic tube compression of the annular body member, such that the end portions of the annular body member are deformed by the electromagnetic tube compression to take a shape in accordance with a shape of the inserted portion of the bracket.

2. The connecting member of a structure according to claim 1, wherein the body member is bent.

3. The connecting member of a structure according to claim 1, wherein at least part of the body member is flattened.

4. The connecting member of a structure according to claim 1, wherein the body member is bent, and at least part of the body member is flattened.

5. The connecting member of a structure according to claim 1, wherein the annular body member is cylindrical.

6. The connecting member of a structure according to claim 1, wherein the least one reinforcing rib is joined to the surface of the plate material by friction stir welding.

7. A connecting member of a structure, comprising:
an annular body member formed of a nonmagnetic material; and
a bracket including a plate material and at least one reinforcing rib that is joined to a surface of the plate material,
wherein the plate material is bent so that part of a portion of the plate material to which the reinforcing rib is joined has a bend line extending in a direction that crosses a direction of extension of the at least one reinforcing rib, and wherein at least one of two inner sides at corresponding end portions of the annular body member has inserted therein a portion of the bracket to which the at least one reinforcing rib is joined so that the direction of extension of the at least one reinforcing rib is along a direction of extension of the annular body member, and wherein the annular body member and a portion of the bracket inserted in the annular body member are clinched by electromagnetic tube compression of the annular body member, such that the end portions of the annular body member are deformed by the electromagnetic tube compression to take a shape in accordance with a shape of the inserted portion of the bracket.

8. The connecting member of a structure according to claim 7, wherein the body member is bent.

9. The connecting member of a structure according to claim 7, wherein at least part of the body member is flattened.

10. The connecting member of a structure according to claim 7, wherein the body member is bent, and at least part of the body member is flattened.

11. The connecting member of a structure according to claim 7, wherein the annular body member is cylindrical.

12. The connecting member of a structure according to claim 7, wherein the least one reinforcing rib is joined to the surface of the plate material by friction stir welding.

* * * * *